United States Patent Office 3,836,444
Patented Sept. 17, 1974

---

3,836,444
PROCESS FOR POLYMERIZING CONJUGATED DIOLEFINS USING ORGANIC COMPOUNDS OF THE TRANSITION METALS AS CATALYSTS
Georgis Codet, Reuil-Malmaison, Franco Dawans, Bougival, and Francois-Xavier de Charentenay, Reuil-Malmaison, France, and Philippe Teyssie, Neuville-en-Combroz, Belgium, assignors to Institut Francais du Petrole, des Carburants et Lubrifiants, Reuil-Malmaison, France
No Drawing. Continuation-in-part of application Ser. No. 862,948, Oct. 1, 1969, now Patent No. 3,739,003. This application Mar. 23, 1973, Ser. No. 344,177
Claims priority, application France, Oct. 1, 1968, 168,366
Int. Cl. C08d 1/00; C08f 1/16
U.S. Cl. 204—159.24                            23 Claims

ABSTRACT OF THE DISCLOSURE

Conjugated diolefins are polymerized with catalysts of the formula $$[(H_{3-n}X_nCCO_2)_mM_T(Y)_p]_qL_r$$

wherein
X is a halogen atom,
n is 1, 2 or 3,
$M_T$ is a transition metal from Groups IV to VIII of the Periodic Chart of the Elements,
Y is an anion other than OH,
each of m, p and q is an integer from 1 to 4 inclusive, m+p being such as to constitute an electrically neutral compound,
L is a Lewis base, and
r is a number from 0 to 2 inclusive,
said compound being used in an amount ranging from $10^{-3}$ to 2 gram-atom of the metal $M_T$ per 100 moles of said conjugated diolefin.

Preferred catalysts include nickel monochlorotrifluoroacetate, nickel monobrome-trifluoroacetate, cobalt monochloro-trifluoroacetate and complexes thereof.

---

CROSS-REFERENCE TO RELATED APPLICATION

This application is a continuation-in-part of a restricted-out invention of our copending application Ser. No. 862,948, filed Oct. 1, 1969, now U.S. Pat. 3,739,003 said co-pending application being incorporated by reference herein.

This invention relates to new organic compounds of the transition metals, their manufacture and uses, particularly as catalysts for converting unsaturated hydrocarbons and more particularly as catalysts for the stereospecific polymerization of monomeric compounds having ethylenic bonds.

These compounds conform to the general formula:

$$[((H_{3-n}X_n)C{-\!\!-}CO_2{-\!\!-})_mM_T(Y)_p]_qL_r$$

wherein

X is a halogen atom, n is 1, 2 or 3, $M_T$ is a transitional metal Groups IV to VIII (sub-groups *a* and *b*) of the Periodic Chart of the Elements;
Y is a hydride ion or an anion, except OH. For example, Y may represent H, F, Cl, Br, I, $ClO_3$, $ClO_4$, $BrO_3$, $IO_3$, CN, SCN, $SO_4$, $S_2O_3$, $S_4O_6$, $NO_3$, $NO_2$, or OR, where R is a hydrocarbon monovalent radical preferably containing 1-30 carbon atoms, for example, alkyl, cycloalkyl, aralkyl or aryl. Y may represent the anion $(H_{3-n}X_n)$ C—$CO_2$ Each of m, p and q is an integer, preferably 1 to 4, m+p being such as to constitute an electrically neutral compound (m+p is usually equal to the valence of $M_T$);

L is a Lewis base such as, for example, an ether, an amine, a phosphine;

r has preferably values from 0 to 2.

These compounds have the following advantages:
They may easily be obtained by reactions which do not involve the use of any unstable organometallic compound.

They have a good stability with respect to time, even when hot, under an inert atmoshpere, which makes their storage and handling easier.

They are inexpensive and involve the use of easily available elements.

The compounds of this invention may be used as catalysts in organic synthesis, in such reactions as dimerization, oligomerization, hydrogenation, oxidation, carbonylation and more particularly stereospecific polymerization of unsaturated hydrocarbons.

This invention particularly discloses a process for polymerizing conjugated diolefins that comprises contacting, under conventional polymerization conditions, a conjugated diolefin with, as the sole or essentially the sole catalyst, a compound as defined hereinabove.

The main advantage of this process is that it yields excellent conversion rates of the conjugated diolefin used, without needing the addition of any cocatalyst, such as a reducing organo-compound or a Lewis acid, as generally required in the processes of the prior art. Besides, the catalysts used in this process differ from other monometal catalysts, which contain metal to carbon bonds, such as metal π-organo-compounds, in particular by an improved stability.

The conjugated diolefins which can advantageously be polymerized by the process of this invention are those having 4–8, preferably 4–5, carbon atoms, e.g., 1,3-butadiene and isoprene.

The preferred catalysts are compounds of the formula given hereinabove in which the transition metal $M_T$ is selected from Group IV A (e.g., titanium), Group VI A (e.g., molybdenum) and Group VIII (e.g., nickel and cobalt) of the periodic chart of the elements.

In these compounds, L is preferably a halogen atom, in most cases chlorine or bromine; the atom X, when n is 1, or at least one of the atoms X, when n is 2 or 3, is preferably a fluorine atom, the other, if any, being preferably chlorine atom(s); besides, when r is other than zero, L preferably represents diethyl ether.

Specific examples of these preferred compounds are those of formulae: $CF_3COONiCl$; $CF_3COONiBr$; $CHF_2COONiCl$; $CF_2ClCOONiCl$; $CF_3COOCoCl$;

$$CF_3COOCoBr;$$

$CF_3COOTiCl$; $(CF_3COO)_2TiCl$; $CF_3COOMoCl$ and $(CF_3COO)_2MoCl$, and their complexes with diethylether.

Also, the compounds in the formulae of which Y is $H_{3-n}X_nCCO_2$ are considered as preferred catalysts in the process of this invention. Preferably the atom X, when n is 1, or at least one of the atoms X, when n is 2 or 3, is a fluorine atom, the other, if any, preferably being chlorine atom(s), besides, when r is other than zero, L preferably represents diethylether.

Specific examples of such compounds are $$(CF_3COO)_2Ni, \; (CF_3COO)_2Co$$

and their complexes with diethylether.

More particularly, the halides of nickel trifluoroacetate of formula $CF_3{-\!\!-}CO_2{-\!\!-}Ni{-\!\!-}Y$ where Y is a halogen atom, preferably chlorine, are catalysts for manufacturing 1,4 cis-elastomeric polybutadiene. The compounds of the general formula above wherein Y is the anion $$(H_{3-n}X_n){-\!\!-}C{-\!\!-}CO_2{-\!\!-}$$

or preferably $CF_3CO_2—$, may also be used as previously indicated.

These catalysts may be made more active by means of one of the following treatments:

Heating at a temperature above 50° C., for example, from 50 to 250° C., and preferably from 70 to 120° C., for at least one minute (for example 1 minute to 24 hours).

Irradiation of the reaction mixture by means of ultraviolet rays for at least one minute (for example 1 minute to 24 hours), at any temperature.

These two types of treatment are particularly efficient when applied to polymerization catalysts in which Y is an anion of the formula $(H_{3-n}X_n)C—CO_2—$.

According to the process of this invention, the catalyst is used in a relative amount of from $10^{-3}$ to 2, advantageously from 0.1 to 2 gram-atoms of metal per 100 moles of the conjugated diolefin to be polymerized.

The polymerization reaction is conducted under conventional polymerization conditions. For example, it can be carried out at a temperature of —40 to +120° C., preferably from 20 to 75° C., and in the presence or in the absence of a diluent. When a diluent is used, it is preferably selected from the group consisting of the saturated aliphatic or cycloaliphatic hydrocarbons, the halogenated aliphatic hydrocarbons and the aromatic and halogenated aromatic hydrocarbons, that are liquid under the reaction conditions used.

Examples of diluents are: hexane, heptane, octane, cyclohexane, benzene, toluene, xylene, methylene chloride, dichloroethane, chlorobenzene, dichlorobenzene and their mixtures.

The polymerization reaction can be conducted under autogenous pressure or under any total pressure sufficient to maintain the reaction mixture substantially in the liquid phase. The pressure to be selected depends on both the particular diluent employed and the polymerization temperature.

When the polymerization is terminated, any conventional procedure can be employed to inactivate the catalyst and recover the final product. For example, in one process the polymer is recovered by entraining the same in diluent vapor. In another process, an inactivator is added to the catalyst, and the polymer is precipitated by the addition of a precipitant, such as ethyl- or isopropyl alcohol. The polymer is then separated by any appropriate step, such as decantation or filtration.

On the other hand, it may be advantageous to add to the polymer solution any conventional additive, for example an anti-oxidant such as N-phenyl β naphthylamine or para-tert-butyl cresol. After the addition of such an antioxidant to the catalyst solution, the polymer can be precipitated in the same manner as previously indicated. In this connection, it is often advantageous to add to the alcohol a complexing or chelating agent which can extract the metal of the catalyst from the polymer, thereby leaving the metal in solution after the polymer is precipitated. Such a complexing or chelating agent is, for example, acetyl acetone or the disodium salt of ethylenediaminetetracetic acid.

After the polymer is separated from the alcohol and diluent by any conventional method, the polymer is thereupon dried, preferably under vacuum.

The polymers produced by the process of this invention are generally normally solid, but at the same time, by manipulation of the reaction times, temperatures and quantities of catalyst, it is possible to obtain polymers which range from lower molecular weight liquids to very high molecular weight solids.

With respect to the polybutadienes which are obtained by this invention, the microstructure thereof has been determined by infrared spectroscopy according to the method of D. Morero, A. Santambrogio, L. Porri and F. Ciampelli ("La Chimica et l'Industria," XLI, 8, 1959).

The new metallic compounds of this invention may be obtained by using well-known processes such as, for example, the reaction of the product resulting from the controlled hydrolysis of a derivative of a transition metal of formula $(Y)_pM_T(OH)_m$ with a haloacetic acid or one of its derivatives, preferably an anhydride thereof, or otherwise, when Y is a halogen anion, by the partial reaction of a halogenation agent with a haloacetate of a transition metal of formula

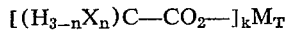

in which $k$ is the valence of the metal $M_T$.

This reaction is advantageously carried out in the solvents of the haloacetate of the transition metal, particularly those inert with respect to the halogenation agents, for example, the ethers or di-ethers, for example, ethylene glycol dialkyl ethers. Any halogenation agent may be used, for example, $PX_5$, $PX_3$, $POX_3$, halogenide of a carboxylic acid (aromatic cycloaliphatic or aliphatic), $SOX_2$, $X_2$ where X may be F, Cl, Br or I. The most favorable are those which are soluble or miscible with the solvent used in the manufacture, or the products of which, after chlorination, are soluble or miscible with this solvent. Thionyl halides are particularly interesting for manufacturing these compounds.

The halogenation temperature is dependent, in part, on the agent employed. It lies generally in the range —20 to +100° C.

The halogenation agent may be used in a stoichiometrical amount or in a different amount, according to the desired conversion rate of the reactants.

The formed compounds may combine with one or more molecules of solvent and/or the products resulting from the decomposition of the halogenation agent. A treatment under vacuum at a temperature between 20 and 250° C., is convenient for eliminating these combined molecules.

The compounds in which Y is an anion other than a halogen or an OR radical may be obtained from the compounds in which Y is a halogen atom by reaction with a convenient salt or alkoxide of a metal, preferably an alkali metal, an alkaline earth metal or silver.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

14.25 g. (50 millimoles) of anhydrous nickel trifluoroacetate dissolved in one liter of anhydrous di-ethyl ether are reacted with 6.25 g. (52.5 millimoles) of thionyl chloride at room temperature. After 6 hours of reaction, 13.14 g. of yellow crystals of the formula

may be isolated by filtration. Conversion rate: 92%.

104 g. of 1,3-butadiene and 40 ccm. of normal heptane are added to 28 g. of the previous compound; after stirring for 22 hours at 50° C., 57 g. of polybutadiene are obtained, the microstructure of which, as determined by infrared spectrophotometry according to the method of D. Morero, A. Santambrogio, L. Porri and F. Ciampelli (La Chemica e l'Industria, XLI –8– 1959) consists of 86% of cis-1,4 units, 9% of trans-1,4 units and 5% of 1,2 units.

EXAMPLE 2

104 g. of 1,3-butadiene and 40 ccm. of normal heptane are added to 2.4 g. of nickel chloride trifluoroacetate $CF_3COONiCl$, manufactured by heating the corresponding etherate for 30 minutes at 150° C. under vacuum; after 4 hours of reaction at 50° C., there is obtained 56 g. of polybutadiene containing 94% of cis-1,4-units, 3% of trans-1,4-units and 3% of 1,2-units; the intrinsic viscosity of the polymer, as determined on a solution of the polymer in toluene at 30° C., is 1.46 dl./g.

EXAMPLE 3

0.57 g. of nickel trifluoroacetate of formula $$(CF_3COO)_2Ni$$

are heated at 150° C., under vacuum, in a reaction vessel. After cooling to —60° C., there is added 5.2 g. of butadiene and 10 ccm. of normal heptane, and the resulting mixture is stirred for 46 hours at 50° C. There are obtained 1.5 g. of polybutadiene having an intrinsic viscosity of 1.9, as determined in toluene at 30° C. The microstructure of the resulting polybutadiene, as determined according to the method of D. Morero, A. Santambrogio, L. Porri and F. Ciampelli (La Chimica e l'Industria, XLI –8– 1959), consists of 95% of cis-1,4-units, 1% trans-1,4-units and 4% 1,2-units.

EXAMPLE 3A

When, in Example 3, nickel trifluoroacetate is replaced with an equivalent amount of nickel acetate, everything else remaining unchanged, no polymer can be obtained.

EXAMPLE 4

2 g. of nickel chloride trifluoroacetate $CF_3COONiCl$, manufactured according to Example 2, are added to a solution of 52 g. of butadiene in 80 ccm. of normal heptane; after stirring at 30° C., for 8 hours, 40 g. of polybutadiene are obtained, the microstructure of which consists of 98% of cis-1,4-units, 0.5% of trans-1,4-units and 1.5% of 1,2 units. The intrinsic viscosity of the polymer is 2 dl./g.

EXAMPLE 5

0.29 g. of cobalt trifluoroacetate of formula $$(CF_3COO)_2Co$$

are heated at 240° C., for 60 minutes, in an argon stream, and 6.8 g. of isoprene dissolved in 10 ccm. of benzene are added thereto. The mixture is stirred at 30° C., for 15 hours. There are obtained 4 g. of polyisoprene, the intrinsic viscosity of which is 2.4 and which contains a high proportion of cis-1,4-units.

EXAMPLE 6

There are used 0.7 g. of nickel chloride trifluoroacetate 52 g. of butadiene and 100 ccm. of toluene. The resulting reaction mixture is subjected at room temperature, for one hour, to the light emitted by a Phillips HPR 125 lamp, and then stirred at 30° C., for one hour. 36 g. of polybutadiene are obtained, containing more than 98% of cis-1,4-units and having an intrinsic viscosity of 2.4 dl./g.

EXAMPLE 7

5.62 g. of the mono-etherate of nickel chloride trifluoroacetate $CF_3COONiCl$, $O(C_2H_5)_2$, manufactured according to Example 1, are dissolved in 400 ccm. of chlorobenzene and the resulting solution is heated under reflux at atmospheric pressure for 30 minutes. 20 ccm. of the solution are introduced in a quartz vessel and 52 g. of butadiene dissolved in 40 ccm. of chlorobenzene are added thereto. The resulting mixture is irradiated by means of a high pressure mercury vapor burner, of the TQ 81 Hannovia type, for 40 minutes. 21 g. of polybutadiene are obtained, containing more than 95% of cis-1,4-units, and the intrinsic viscosity of which is 1.74 dl./g.

EXAMPLE 8

There are used 0.57 g. of nickel chloride trifluoroacetate 52 g. of butadiene and 40 ccm. of ortho-dichlorobenzene. The reaction mixture is irradiated for 20 minutes under the same conditions as in Example 7. There are obtained 31 g. of essentially cis-1,4-polybutadiene, the intrinsic viscosity of which is 1.8 dl./g.

EXAMPLE 9

When, in the preceding example, ortho-dichlorobenzene is replaced with a corresponding amount of methylene chloride, without any other change, the conversion to polymer is practically 100%; however, about 10% of the polymer appears as a gel which is insoluble in hydrocarbons.

EXAMPLE 10

Example 9 is repeated, except that the reaction solvent is nitro-ethane; 40 g. of polybutadiene are obtained, containing 97% of cis-1,4-units, 2% of trans-1,4-units and 1% of 1,2-units.

EXAMPLE 11

28.5 g. (100 millimoles) of anhydrous nickel-trifluoroacetate ($CF_3$—COO—)$_2$Ni dissolved in one liter of anhydrous di-ethyl ether are treated at room temperature with 19.8 g. (95 millimoles) of thionyl bromide. After 14 hours of reaction, the mixture is filtered and yellow crystals may be recovered and dried under vacuum at 100° C. There is thus obtained 23.2 g. (conversion=92%) of a compound whose elemental analysis is in agreement with the formula $CF_3COONiBr$.

When 52 g. of butadiene and 40 ccm. of toluene are added to 0.32 g. of nickel bromide trifluoracetate, there are obtained, after stirring at 50° C., for 30 minutes, 46 g. of polybutadiene containing more than 98% of cis-1,4-units, the intrinsic viscosity of which is 1.64 dl./g.

EXAMPLE 12

28.5 g. (100 millimoles) of anhydrous cobalt trifluoroacetate dissolved in 500 cm. of anhydrous diethyl ether are treated with 11.9 g. (100 millimoles) of thionyl chloride. After 6 hours of reaction, the mixture is filtered and there are obtained violet crystals which are dried under vacuum at room temperature and conform to the formula $CF_3COOCoCl$, $O(C_2H_5)_2$. By heating the violet crystals at 100° C., under vacuum, there are obtained 19.9 g. (conversion rate of 96%) of blue crystals, the analysis of which conforms to formula $CF_3COOCoCl$.

52 g. of butadiene and 40 ccm. of normal heptane are added to 1 g. of cobalt chloride trifluoracetate. The resulting mixture is irradiated for 2 hours at 25° C., by means of a Phillips HPR lamp; the conversion to essentially cis-1,4-polybutadiene is about 100%.

EXAMPLE 13

When, in Example 12, the butadiene is replaced with a corresponding amount of isoprene and normal heptane with toluene, there are obtained 21 g. of polyisoprene containing 54% of cis-1,4-units, 15% of trans-1,4-units and 31% of 3,4-vinyl units. The intrinsic viscosity of the polymer dissolved in toluene at 30° C., is 0.47 dl./g.

EXAMPLE 14

4.8 g. (100 milliatoms) of powdered titanium are reacted with an excess of trifluoroacetate acid. The formed compound is dried under vacuum at 140° C., and dissolved in 400 ccm. of anhydrous ethyl ether. After decantation, so as to separate the unreacted titanium, the solution is treated with 11.9 g. (100 millimoles) of thionyl chloride. After 6 hours of reaction at room temperature, there may be obtained by filtration, white crystals which are thereafter dried under vacuum at 150° C.; 13.1 g. (conversion rate of 67%) of a compond conforming to the formula $CF_3COOTiCl$ may be obtained.

1.7 g. of titanium chloride trifluoroacetate are reacted with 34 g. of isoprene dissolved in 40 ccm. of toluene. After stirring at 50° C., for 6 hours, there are obtained 6 g. of polyisoprene, the microstructure of which consists of 72% of trans-1,4-units and 28% of cis-1,4-units.

EXAMPLE 15

104 g. of 1,3-butadiene and 80 ccm. of toluene are added to 2.7 g. (about $1.1 \times 10^{-2}$ mole) of molybdenum chloride trifluoroacetate of the formula $CF_3COOMoCl$. After 4 hours of stirring at 60° C., there is obtained 67 g. of a polybutadiene having a microstructure composed of 80% of 1,2-units, 15% of cis-1,4-units and 5% of trans-1,4-units and an intrinsic viscosity at 30° C., in toluene of 1.72 dl./g.

The periodic chart of the elements mentioned in this disclosure is commonly known as Mendeleeff's Periodic Arrangement of the Elements, the A group being the main group and the B group being the subgroup.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a catalytic process for the polymerization of conjugated diolefins of 4-8 carbon atoms, the improvement which comprises employing as essentially the sole catalyst, a compound of the general formula $$[(H_{3-n}X_nCCO_2)_mM_T(Y)_p]_qL_r$$

wherein X is a halogen atom, $n$ is 1, 2 or 3, $M_T$ is a transition metal selected from the group consisting of Group IVA, Group VIA and Group VIII of the Periodic Chart of the Elements, Y is an anion other than OH, each of $m$, $p$ and $q$ is an integer from 1 to 4 inclusive, $m+p$ being such as to constitute an electrically neutral compound, L is a Lewis base and $r$ a number from 0 to 2 inclusive, said compound being used in an amount ranging from $10^{-3}$ to 2 gram-atoms of the metal $M_T$ per 100 moles of said conjugated diolefin.

2. A process as claimed by Claim 1 in which Y is a halogen atom.
3. A process as claimed by Claim 2 in which at least one of the atoms X is a flourine atom.
4. A process as claimed by Claim 1 in which Y is $H_{3-n}X_nCCO_2$.
5. A process as claimed by Claim 4 in which at least one of the atoms X is flourine.
6. A process as claimed by Claim 1 in which $r$ is zero.
7. A process as claimed by Claim 2 in which L is diethlyether and $r$ is other than zero.
8. A process as claimed by Claim 1 in which the catalyst is activated by heating at a temperature from 50 to 250° C., for at least one minute.
9. A process as claimed by Claim 8 in which said heating is effected at a temperature from 70 to 120° C.
10. A process as claimed by Claim 1 in which the catalyst is activated by irradiating the reaction mixture by means of ultra-violet rays for at least one minute.
11. A process as claimed by Claim 1 in which $M_T$ is nickel.
12. A process as claimed by Claim 1 in which $M_T$ is cobalt.
13. A process as claimed by Claim 1 in which $M_T$ is titanium.
14. A process as claimed by Claim 1 in which $M_T$ is molybdenum.
15. A process as claimed by Claim 2 in which the catalyst used is selected from the group consisting of nickel chloride trifluoroacetate of the formula $$CF_3COONiCl$$

and its complexes with diethly ether.
16. A process as claimed by Claim 2 in which the catalyst used is selected from the group consisting of nickel bromide trifluoroacetate of formula $$CF_3COONiBr$$

and its complexes with diethlyether.
17. A process as claimed by Claim 2 in which the catalyst used is selected from the group consisting of cobalt chloride trifluoroacetate of formula $$CF_3COOCoCl$$

and its complexes with diethlyether.
18. A process as claimed by Claim 2 in which the catalyst used is selected from the group consisting of titanium chloride trifluoroacetate of formula $CF_3COOTiCl$ and its complexes with diethylether.
19. A process as claimed by Claim 2 in which the catalyst used is selected from the group consisting of molybdenum chloride trifluoroacetate of formula $$CF_3COOMoCl$$

and its complexes with diethylether.
20. A process as claimed by Claim 4 in which the catalyst used is selected from the group consisting of nickel trifluoroacetate of formula $(CF_3COO)_2Ni$ and its complexes with diethylether.
21. A process as claimed by Claim 4 in which the catalyst used is selected from the group consisting of cobalt trifluoroacetate of formula $(CF_3COO)_2Co$ and its complexes with diethylether.
22. A process as claimed by Claim 1 in which the conjugated diolefin to be polymerized is 1,3-butadiene.
23. A process as claimed by Claim 1 in which the conjugated diolefin to be polymerized is isoprene.

References Cited
UNITED STATES PATENTS
3,739,003    6/1973    Codeb et al. _____ 260—439 R MURRAY TILLMAN, Primary Examiner R. B. TURER, Assistant Examiner U.S. Cl. X.R.

260—94.3, 429.5, 439 R

UNITED STATES PATENT OFFICE
CERTIFICATE OF CORRECTION

Patent No. 3,836,444      Dated September 17, 1974

Inventor(s) Georgis Codet, et al.

It is certified that error appears in the above-identified patent and that said Letters Patent are hereby corrected as shown below:

IN THE HEADING, COLUMN 1:

Inventor "Franco Dawans" should read -- Francois Dawans --.

Signed and sealed this 19th day of November 1974.

(SEAL)
Attest:

McCOY M. GIBSON JR.
Attesting Officer

C. MARSHALL DANN
Commissioner of Patents